April 22, 1969     H. FRIGGER     3,439,780
DISK BRAKE AND ACTUATOR THEREFOR
Filed June 8, 1967     Sheet 1 of 2
FIG. 1
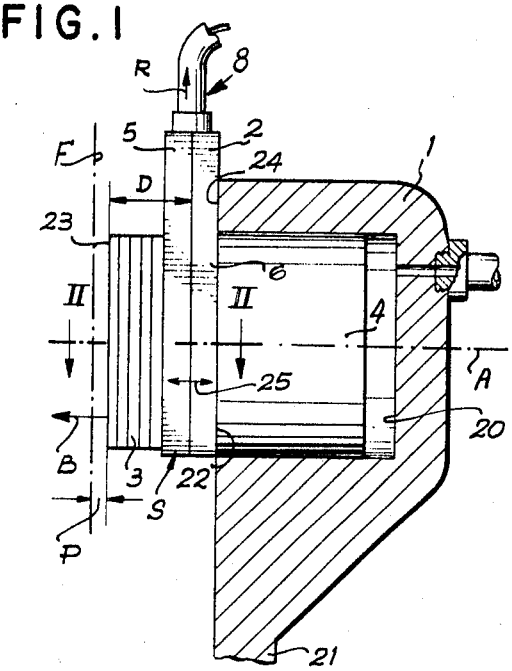
FIG. 2
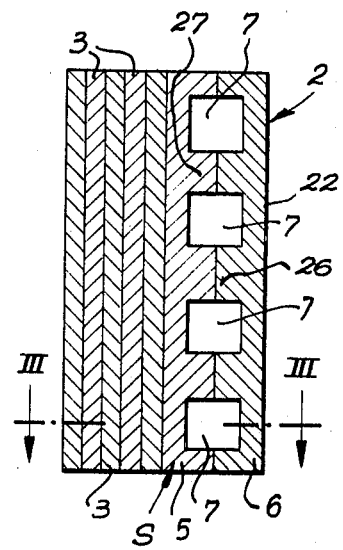
FIG. 3
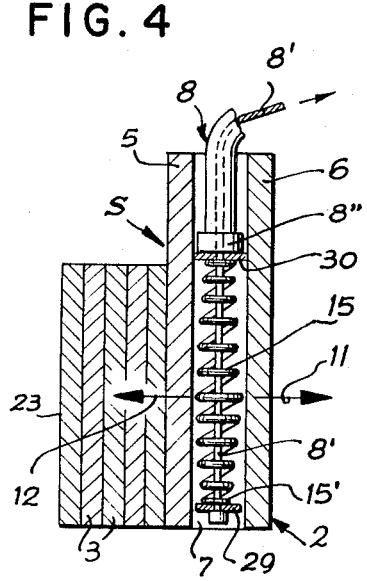
FIG. 4
INVENTOR:
HEINZ FRIGGER.
BY Karl J. Ross
ATTORNEY

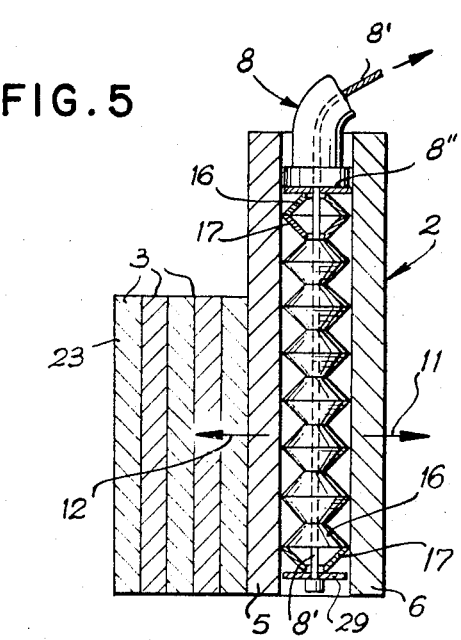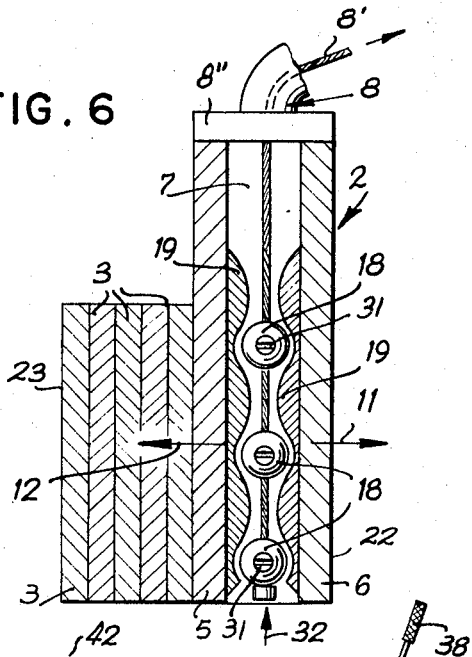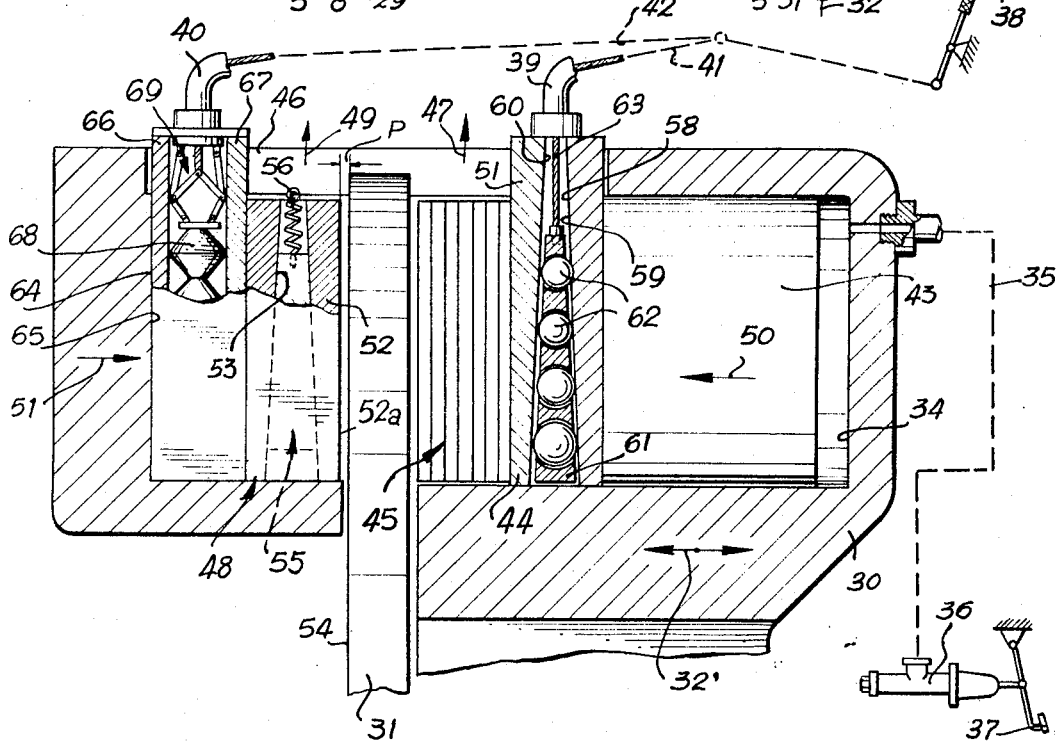

United States Patent Office 3,439,780
Patented Apr. 22, 1969

3,439,780
DISK BRAKE AND ACTUATOR THEREFOR
Heinz Frigger, Langen-Oberlinden, Germany, assignor to Alfred Teves Maschinen- und Armaturenfabrik KG, Frankfurt am Main, Germany, a corporation of Germany
Filed June 8, 1967, Ser. No. 644,588
Claims priority, application Germany, June 25, 1966, T 31,456
Int. Cl. F16d 65/14, 55/00
U.S. Cl. 188—106   9 Claims

ABSTRACT OF THE DISCLOSURE

Disk brake having a brake yoke disposed along the periphery of a rotatable disk, at least one brakeshoe shiftable against a braking face of the disk and co-operating with an actuating member (e.g., piston or lever) for shifting the brakeshoe into engagement with the disk, and an auxiliary mechanism for relatively displacing the braking surface of the shoe and the braking face of the disk, the auxiliary mechanism being disposed directly within the brakeshoe between the braking surface thereof and the surface of the backing plate upon which the actuating member acts. The brakeshoe includes a backing plate member and a lining member bonded to the backing-plate member, one of these members containing a self-adjusting mechanism for automatically advancing the braking surface of the lining relative to the abutment surface of the backing plate upon an increase in the play of the brakeshoe indicative of wear, or a manually operable mechanism for advancing the braking surface of the lining when the mechanism is used as a locking, emergency brake or parking brake system.

---

My present invention relates to a disk-brake system having self-adjusting means and/or a manually operated mechanism for advancing the friction surface of the brakeshoe relative to the braking face of the disk to compensate automatically for wear of the brake lining or for engagement with the disk so as to lock the latter with respect to the brake support in a parking-brake, emergency-brake or brake-lock arrangement.

In general, a disk-brake system comprises a brake support housing or yoke affixed to the axle housing of an automotive vehicle wheel or to another part of the vehicle chassis, extending around and along the periphery of a braking disk which is mounted upon the axle and/or coupled to the vehicle wheel. The brake disk has a pair of annular braking faces usually transverse to the axis of rotation of the disk, which are flanked by a pair of brake shoes mounted in the yoke and urged in the direction of the disk by actuating means. In hydraulic-brake systems, the actuating means can include one or more wheel-brake cylinders which are supplied with hydraulic fluid from a master cylinder operated by the brake pedal of the vehicle. When two-wheel cylinders are provided for each disk brake, each lobe of the yoke, which is axially fixed with respect to the disk, is formed as a respective cylinder and provided with a respective piston hydraulically displaceable in a direction perpendicular to the respective face of the disk, a brakeshoe being interposed between the actuating members (i.e., the pistons) and the disk in juxtaposition with one another to prevent distortion of the disk when the brake is applied. In disk-brake systems utilizing only a single hydraulic cylinder in each brake-support yoke, either the yoke or the disk is mounted for limited axial movement and the hydraulic cylinder is provided in one lobe of the yoke while the other lobe carries a brakeshoe which is brought into frictional engagement with the disk by the hydraulic reaction force on the cylinder when the piston applies its brakeshoe to the opposite face of the disk.

In some cases, the actuating member may be a lever arrangement (e.g., a scissor linkage), which is hydraulically operable to clamp the brakeshoe against the disk, the actuating member being here constituted by one or more levers bearing upon the respective brakeshoes directly or through a force-transmitting member, or applying the brakeshoes via axially shiftable yokes in the manner previously described. As brake wear proceeds, the "play" of the brakeshoe between the actuating member and the disk tends to increase, thereby requiring a greater stroke for braking actuation. To compensate such wear, devices have been proposed for restricting the return stroke of the piston or lever members and thereby reducing the play. Such systems are highly complex and must be built into the brake arrangement at considerable expense. It is not possible to simply replace an element of the brake to provide it with a self-adjusting mechanism or to replace the self-adjusting mechanism. Furthermore, in substantially all prior arrangements whereby the main brake, constituted as described above, is provided with an auxiliary mechanism operable from the driver's position of the vehicle for applying one or both brakeshoes to the disk, relatively complex systems must be used; these systems are also characterized by the fact that they must be built into the brake, often require modification of the cylinders and piston, and cannot readily be modified, replaced or examined.

It is, therefore, the principal object of the present invention to provide, in a disk-brake system of the character described wherein at least one brakeshoe is shiftable in a brake-support yoke against a respective braking face of the disk by an actuating member engaging an abutment surface of the brakeshoe, an improved arrangement for wear and/or an improved manually operable mechanism suitable for use as a parking brake, emergency brake or wheel-locking brake.

A further object of this invention is to provide a disk-brake system in which the self-adjusting mechanism and/or manually operable mechanism can be conveniently replaced, exchanged or installed without requiring dismounting of the entire brake assembly and without any of the disadvantages of the earlier systems described above.

Another object of this invention is to provide a relatively simple, inexpensive and convenient system for use in conventional disk brakes whereby self-adjusting or manual lock action can be obtained.

These objects and others, which will become apparent hereinafter, are attained in accordance with the present invention, by providing a disk brake having a support disposed along the periphery of the disk and having an actuating member (e.g., a piston) bearing upon an abutment surface of the brakeshoe for urging the latter against the annular braking face of the disk at a braking surface of the brake lining, and an auxiliary (e.g., self-adjusting or manually operable) mechanism within the brakeshoe between the abutment surface and the braking surface, preferably either in the backing-plate member or in the lining member of the shoe, for advancing the braking surface of the lining with respect to the abutment surface of the backing plate. Thus the brakeshoe can be provided with a pair of interfitting or juxtaposed portions which are mutually shiftable relatively in the direction of application of the brakeshoe, i.e., perpendicularly to the braking face of the disk, the braking surface of the lining and the abutment surface of the support plate (and parallel to the axis of the actuating piston) and receive between them a self-adjusting or manually operable device for spreading these portions as may be required for self-adjusting action or for emergency-brake, parking-brake and locking operation. The relative movable parts advantageously define a housing in which the auxiliary device is enclosed, this device consisting of springs or the like adapted to urge the housing parts apart or a force-translating mechanism operated by a Bowden cable, lever or the like for transforming a force parallel to the backing plate into a separating pressure in the direction of movement of the brakeshoe. The interior of the housing thus formed can be columnar or shaft-like with the interior cavity running parallel to the surface mentioned above and preferably opening at the upper extremity of the brakeshoe.

The above and other objects, features and advantages of the present invention will become more readily apparent from the following description, reference being made to the accompanying drawing in which:

FIG. 1 is a diagrammatic axial cross-sectional view of one half of a disk brake, according to the present invention;

FIG. 2 is a cross-sectional view drawn to an enlarged scale taken along the line II—II of FIG. 1;

FIG. 3 is a cross-sectional view taken along the line III—III of FIG. 2, representing one embodiment of an actuating mechanism, in accordance with the present invention;

FIGS. 4–6 are crosss-sectional views similar to FIG. 3, showing other embodiments of this invention; and FIG. 7 is an axial cross-sectional view through a disk-brake system having both a self-adjusting arrangement and a locking-brake device in accordance with other principles of the invention.

Referring first to the system represented in FIGS. 1–3, in which only part of the disk brake is shown, it can be seen that the disk brake comprises a brake housing 1 forming a hydraulic cylinder 20 to which hydraulic fluid is supplied from a brake master cylinder (FIG. 7) in the usual manner. The housing 1 can be affixed to the axle housing of a vehicle wheel by the lug 21 and will generally constitute part of a brake yoke. The cylinder 20 slidably receives a hydraulically actuatable piston 4 which has an axis A perpendicular to the annular braking face F of the disk (see FIG. 7) against which the brakeshoe S is urged in the direction of arrow B. The brakeshoe, which is guided in the yoke 1 for movement toward and away from the braking face F of the disk in a conventional manner, may be removed from the yoke in the direction of arrow R for lining replacement, inspection, or the like, an opening being provided in the yoke for this purpose. The brakeshoe S has a metallic backing plate 2 whose rear surface 22 forms an abutment for the piston 4, the latter constituting the actuating member of this brake, while a lining 3 of high frictional coefficient and low wear is bonded to the backing plate 2. The surface 23 of the lining 3 constitutes the braking surface of this arrangement. According to the principles of the present invention, either the backing plate member 2 or the brake lining 3 receives an actuating mechanism for the automatic increase of the distance D between the abutment surface 22 and the braking surface 23 of the shoe, thereby controlling the play P between the brake lining and the braking face F of the disk (when the device is a self-adjusting mechanism) or shifting the surface 23 through the distance P when the abutment surface 22 is seated against a stop 24 formed by the yoke 1 for locking-brake engagement of the disk. The actuating device is here represented by a Bowden cable 8 which extends into the compartment between the two backing-plate portions 5 and 6 to spread these portions apart (arrow 25) when the Bowden cable is tensioned.

As can be seen from FIGS. 2 and 3, the backing plate 2 of the brakeshoe S is hollow and is provided with shaft-like, parallel and mutually spaced compartments 7 between the parts 5 and 6 of the backing plate. The ribs 26 and 27 flanking each compartment 7 can be interfitting or connected with guide elements to prevent transverse shifting of the two parts of the backing plate, although the self-adjusting and/or manually actuating devices received therein can also bridge the channel-shaped recesses in each of the plate portions defining the respective compartment and thereby prevent lateral shifting. Plate 6 forms the surface 22 against which the actuating member of the brake (i.e., piston 4) bears. As can be seen in FIG. 3, plate half 6 is shiftable limitedly in the direction of arrow 11, its movement in this direction being restricted by the abutment 24 of the yoke 1 or the piston 4, while the plate half 5 carrying the brake lining 3 is movable in the direction of the braking face F of the disk (arrow 12). In this embodiment, the actuating cable 8 has a core wire 8′ which is anchored to the connected remote extremities 27 of a pair of outwardly bowed spring plates 13 and 14 whose connected upper extremity 28 is seated against the sheath 8″ of the Bowden cable. Thus as the Bowden line is tensioned, the extremities 27 and 28 of the bowed springs, disposed as a single unit in one of the compartments 7 or a plurality of such units operated by a single Bowden line, are drawn together as represented by arrows 9 and 10 to bulge the springs outwardly (arrows 11 and 12) and advance the braking surface 23 of the lining 3 into contact with the braking face F of the disk. Since the spring assembly 13, 14 bridges the registering channels in the backing plate 2 which define the housing for the actuating mechanism, there is no lateral relative shifting of plate 5 and plate 6.

In FIG. 4, I show a modification of this arrangement wherein a helicoidal or spiral type compression spring 15 has its lower extremity 15′ anchored to a plate 29 to which the core wire 8′ of the Bowden line is affixed. The plate 29 bridging the channels and precluding lateral movement of the plates 5 and 6 of the brakeshoe S. In this case, the sheath 8″ is seated against the upper extremity 30 of the coil spring 15 which, when its extremities are drawn together by tension on the Bowden cable 8, bulges outwardly (arrows 11 and 12) to bring plate portion 6 to rest against the housing at 24 or the piston 4 while the braking surface 23 engages the disk. In the system of FIG. 5, the outwardly spreadable members are frustoconical or dished (Belleville) spring washers 16 and 17 in stacked relationship (base to base, apex to apex) through which the core wire 8′ of the Bowden cable 8 extends to an anchorage at plate 29. Spring washers of this type, when axially compressed, flatten to substantially disk shape and spread outwardly to bias the plates 5 and 6 in the direction of arrows 11 and 12 as previously noted. At the upper end of the stack, the dished washers bear against the sheath 8″ of the Bowden cable. Here, the Belleville washers themselves form the means bridging the channels and preventing lateral displacement of the plates. The system of FIG. 6 provides a camming arrangement in which a multiplicity of rollers 18 have journal pins 31 transfixed by the core wire 8′ of the Bowden cable 8 and spaced therealong. The rollers whose generatrices extend perpendicularly to the arrows 11 and 12, parallel to the surfaces 22 and 23 and perpendicularly to the direction of movement of these rollers (arrow 32) are located in troughs between the corrugations or rounded ridges 19 formed along the floors of the channels defining compartment 7. Thus, when the rollers 18 are drawn upwardly by the Bowden cable whose sheath is seated against the backing plate 2, the plate portions 5 and 6 are urged outwardly (arrows 11 and 12) to apply the brake lining against the disk. In other modifications readily apparent to those skilled in the art and included within the contemplation of the present invention are systems equivalent to that of FIG. 6 in which the rollers are represented by balls transfixed by the core wire 8′ and slidingly (instead of rollingly) engaging the ramps 19 or systems in which the rollers, balls or needle bearings are mounted in a cage displaced by the cable.

In FIG. 7, I show a modification of this invention wherein the brake yoke 30 is axially shiftable relative to the disk 31 as represented by arrow 32′ and is provided, on one side of the disk, with a hydraulic cylinder 34 which is supplied with hydraulic fluid from a line 35, connected to the master cylinder 36, of the vehicle whose brake pedal is represented at 37. The actuating means for the handbrake is represented at 38 and is connected to the Bowden line 39 and 40 as represented by the dot-dash lines 41 and 42. It will be understood that reference to "manual" actuation is also intended to include pedal operation of the locking brake, emergency brake etc. Ahead of the piston 43, I provide a brakeshoe 44 whose brake lining 45 can be urged against the disk by hydraulic fluid supplied to the cylinder 34 in the usual manner. At its upper end, the yoke is provided with an opening 46 permitting radial removal of the brakeshoe 44 (arrow 47) and the other brakeshoe 48 (arrow 49). When hydraulic fluid is applied to the cylinder 34, piston 43 moves to the left (arrow 50) to bring the brake lining 45 into engagement with the disk 31, the reaction force shifting the yoke 30 in the direction of arrow 51 to bring the opposing brakeshoe 48 to bear upon the opposite surface of the disk.

The brake lining 52 of the left-hand brakeshoe 48 is provided, in accordance with this invention, with a self-adjusting device represented by an inclined-plane ramp 53 convergent toward the braking face 54 of the disk. A wedge body 55 is urged upwardly by a spring 56 to shift the forward portion 52a of the brake lining in the direction of the disk and thereby eliminate excessive play, this play being enlarged for convenience in the illustrated system. The wedge 55 and the ramp 53 co-operate in a self-locking system whereby axial pressure cannot overcome the frictional resistance of the wedge and displace it against the force of spring 56. The surfaces of wedge 55 and ramp 53 can, of course, be roughened or provided with unidirectional complementary teeth as is necessary. Whenever the play exceeds that required for proper operation of the brake, the wedge 55 will be advanced upwardly to effect compensation. It will be understood that, as illustrated here, each of the previously described embodiments can also be provided with self-adjusting means in the brake lining in addition to or in place of the mechanisms illustrated in the backing plates. Similarly, the remotely operated devices can be provided in the linings.

The backing plate 57 of the brakeshoe 44 is provided with upwardly convergent shaft-shaped channels 58 between the plate portions 59 and 60 in which is disposed a cage 61 for the ball bearings 62. When this cage is displaced upwardly by the core wire 63 of the Bowden cable 39, the members 59 and 60 are wedged apart as the balls ride up the inclined planes defining the channel 58 and urge the brake lining 45 against the disk 31. Additionally, or in place of the mutually actuated device of the brakeshoe 44, the brakeshoe 48 may be provided at its backing plate 64 with columnar compartment 65 between the separable portions 66 and 67 of the backing plate. A stack of Belleville washers or dished springs is provided at 68 in this embodiment, while a toggle mechanism 69, actuated by the cable 40, is provided to compress the spring assembly 68 and urge the brakeshoe 52 against the disk 31.

It will be understood that the aforedescribed system has some significant advantages not heretofore attainable. Thus, both the self-adjusting and the manually operable mechanisms are highly simplified and of compact construction so that the brake may be of minimum size and the systems can be stored with ease. Furthermore, the mechanisms are of such simple construction that manufacturing and assembly costs are substantially reduced. For example, a parking brake can be installed in a conventional disk brake not provided with such a mechanism simply by withdrawing a worn brakeshoe and inserting instead a brakeshoe of the type described in connection with FIGS. 3–7. Any damage to the self-adjusting means or the manual brake can be corrected in the course of normal brake inspection and repair by such exchange of brakeshoes and self-adjustment can be provided even where the prior brake was provided with a self-adjusting device subsequently rendered defective. Another advantage resides in the fact that the use of the assembly within the brakeshoe imparts a natural elasticity in the compressive sense to the brakeshoe, thereby permitting uniform and concurrent engagement with the disk and wear of the linings. Furthermore, the Bowden lines can be located conveniently even where very little clearance is provided between the wheel hub and the wheel rim.

The invention described and illustrated is believed to admit of many modifications within the ability of persons skilled in the art.

I claim:

1. A disk brake comprising a rotatable brake disk having at least one annular braking face; a brake support disposed along the periphery of said disk; at least one brakeshoe mounted on said support and having a braking surface juxtaposed with said face of said disk while being shiftable thereagainst for frictional engagement with said disk to brake the rotation thereof relatively to said support; an actuating element mounted on said support and acting upon an abutment surface of said brakeshoe for shifting same in the direction of said braking face, said brakeshoe having a backing-plate member forming said abutment surface and a brake lining member carried by said backing-plate member and forming said braking surface; at least one of said members being subdivided into a pair of relatively spreadable portions defining between them an elongated chamber; and an auxiliary mechanism at least partly received in said brakeshoe between said braking surface and said abutment surface for displacing said braking surface relatively to said abutment surface and said disk in said direction, said auxiliary mechanism including a spring means received in the elongated chamber of said brakeshoe and adapted to be drawn linearly in another direction generally parallel to said surface by means compressing said spring means to bulge said spring means outwardly and spread said portions for urging said braking surface and said abutment surface apart, and operating means actuatable at a location remote from said brakeshoe and extending into the latter for drawing said spring means linearly in said other direction.

2. The disk brake defined in claim 1, further comprising a self-adjusting device mounted in one of said members for urging said abutment surface and said braking surface apart upon the development of excessive play of said brakeshoe with wear of said lining member.

3. The disk brake defined in claim 1 wherein said operating means includes a Bowden cable.

4. The disk brake defined in claim 1 wherein said operating means includes a toggle linkage.

5. The disk brake defined in claim 1 wherein said one of said members is said backing-plate member, said actuating means is a piston acting upon the backing plate member, and said support is provided with an opening facilitating withdrawal of said brakeshoe therefrom without dismounting said support.

6. A disk brake comprising:
   a rotatable brake disk having at least one annular braking face;
   a brake support yoke disposed along the periphery of said disk and forming a brake cylinder opening in the direction of said disk;
   a piston hydraulically displaceable in said cylinder in the direction of said disk;
   a brakeshoe disposed between said piston and said braking face, said brakeshoe comprising a backing plate engageable by said piston and a lining fixed to said backing plate and engageable with said annular braking face, said backing plate being formed of at least two relatively spreadable portions defining between them a channel extending parallel to said face;
   elongated spring means received in said channel and longitudinally compressible for urging said portions apart, thereby shifting said brake lining against said disk; and
   a Bowden cable extending into said channel and anchored to said elongated spring means for longitudinally compressing same.

7. The disk brake defined in claim 6 wherein said elongated spring means comprises a stack of Belleville washers, said Bowden cable having a wire extending through said stack and anchored to one end thereof.

8. The disk brake defined in claim 6 wherein said elongated spring is a coil-compression spring with a central portion of relatively large diameter and end portions of narrow diameter, said Bowden cable having a wire extending through said spring and anchored to an end thereof.

9. The disk brake defined in claim 6 wherein said spring means includes at least a pair of opposing outwardly bowed spring elements bearing upon the respective portions of said backing plate, said Bowden cable having a wire extending between said spring elements and anchored to corresponding ends thereof.

References Cited

UNITED STATES PATENTS

| 2,307,663 | 1/1943 | Bernhardt | 188—73 X |
| 2,983,338 | 5/1961 | Vansteenkiste | 188—73 |
| 3,185,263 | 5/1965 | Schanz et al. | 188—73 X |
| 3,269,491 | 8/1966 | Belart et al. | 188—73 |
| 3,340,967 | 9/1967 | Farr et al. | |

FOREIGN PATENTS 968,897  9/1964  Great Britain.

GEORGE E. A. HALVOSA, *Primary Examiner.*

U.S. Cl. X.R.

74—110; 188—73